(12) United States Patent
Hedman et al.

(10) Patent No.: US 9,097,312 B2
(45) Date of Patent: Aug. 4, 2015

(54) MULTI-CLUTCH TRANSMISSION FOR A MOTOR VEHICLE

(75) Inventors: Anders Hedman, Marstrand (SE); Daniel Stålberg, Eskilstuna (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 14/241,498

(22) PCT Filed: Aug. 30, 2011

(86) PCT No.: PCT/EP2011/004357
§ 371 (c)(1),
(2), (4) Date: Mar. 28, 2014

(87) PCT Pub. No.: WO2013/029640
PCT Pub. Date: Mar. 7, 2013

(65) Prior Publication Data
US 2014/0202272 A1    Jul. 24, 2014

(51) Int. Cl.
*F16H 3/08* (2006.01)
*F16H 3/087* (2006.01)
*F16H 3/00* (2006.01)
*F16H 37/04* (2006.01)
*F16H 3/097* (2006.01)
*F16H 61/04* (2006.01)

(52) U.S. Cl.
CPC ............... *F16H 3/087* (2013.01); *F16H 3/006* (2013.01); *F16H 3/097* (2013.01); *F16H 37/043* (2013.01); *F16H 2061/0429* (2013.01); *F16H 2200/0052* (2013.01); *F16H 2200/0078* (2013.01); *Y10T 74/19233* (2015.01)

(58) Field of Classification Search
USPC .................................................. 74/330, 331
See application file for complete search history.

(56) References Cited

U.S. PATENT DOCUMENTS 3,817,123 A * 6/1974 Whateley et al. ............... 74/745
4,136,575 A * 1/1979 Labat .............................. 74/359
4,388,838 A * 6/1983 Richards et al. ................ 74/331

(Continued)

FOREIGN PATENT DOCUMENTS

DE         923402       7/1949
DE         3131156 A1   2/1983

(Continued)

OTHER PUBLICATIONS

International Search Report (Jan. 17, 2012) for corresponding International application No. PCT/EP2011/004357.

*Primary Examiner* — Ha D Ho
(74) *Attorney, Agent, or Firm* — WRB-IP LLP

(57) ABSTRACT

A multi-clutch transmission for a motor vehicle with a prime mover has a main transmission, a range section and an output shaft, the main transmission including one input shaft, a main shaft and a main countershaft, the main shaft being rotationally fixed with a range input shaft of the range section, the range section including a range main shaft that is rotationally fixed with the output shaft, a range countershaft, range gearwheels that can selectively transfer power from the range input member to the range countershaft and on to the range main shaft, and range clutches, the multi-clutch transmission including a by-passing torque path in which power can be transferred when the range section is shifted, and where the by-passing torque path includes a by-passing clutch that selectively can rotationally lock the main countershaft to the range countershaft.

10 Claims, 5 Drawing Sheets

(56) References Cited

U.S. PATENT DOCUMENTS

| | | | |
|---|---|---|---|
| 4,658,663 A * | 4/1987 | Hiraiwa | 74/359 |
| 4,777,837 A | 10/1988 | Lehle | |
| 5,150,628 A | 9/1992 | Alfredsson | |
| 5,347,879 A | 9/1994 | Ordo | |
| 5,385,066 A * | 1/1995 | Braun | 74/331 |
| 5,511,437 A | 4/1996 | Braun | |
| 5,546,823 A * | 8/1996 | Stine et al. | 74/331 |
| 5,592,854 A | 1/1997 | Alfredsson | |
| 6,595,077 B1 * | 7/2003 | Geiberger et al. | 74/330 |
| 6,958,028 B2 | 10/2005 | Janson et al. | |
| 7,070,534 B2 | 7/2006 | Pelouch | |
| 7,353,724 B2 | 4/2008 | Chen | |
| 2008/0188342 A1 | 8/2008 | Jackson | |
| 2009/0036247 A1 | 2/2009 | Earhart et al. | |

FOREIGN PATENT DOCUMENTS

| | | |
|---|---|---|
| DE | 10325647 A1 | 2/2004 |
| DE | 10339758 A1 | 6/2006 |
| DE | 102005030987 A1 | 1/2007 |
| DE | 102005033027 A1 | 1/2007 |
| DE | 102006015661 A1 | 10/2007 |
| DE | 102009020550 A1 | 11/2010 |
| EP | 1624232 A1 | 2/2006 |
| EP | 2123941 A1 | 11/2009 |
| WO | 2011069526 A1 | 6/2011 |

* cited by examiner

MULTI-CLUTCH TRANSMISSION FOR A MOTOR VEHICLE

BACKGROUND AND SUMMARY

The present invention relates to vehicle transmissions, especially for heavy, on- and off-road vehicles, and more particularly to dual- and multi-clutch transmissions with a range section that, as set out in the preamble of claim 1 and as disclosed in U.S. Pat. No. 5,511,437.

Dual clutch transmissions are a cross-breed between conventional stepped transmissions, with power interruption at gear shifts, and powershifting, without power interruption, planetary transmissions. In principle, a dual clutch transmission has two input shafts, each connectable to a friction clutch and to the output of the engine. Functionally, this is equivalent to having two conventional transmissions in parallel, i.e., two parallel sub-transmissions, and using one at a time for poller transfer. The sub- transmission that is not used, idling, for the time being! can have a gear engaged and prepared for a subsequent shift. This shift is carried out by simultaneously disengaging the friction clutch of the previously used sub-transmission and engaging the friction clutch of the previously idling sub-transmission.

When properly designed, dual clutch transmissions have a potential of providing powershifts at a reasonable production cost and low power losses. This is due to the fact that the rotating parts, i.e., gearwheels, shafts and tooth clutches, are similar to those in conventional stepped transmissions. This, furthermore, enables the use of the same production equipment. So, it makes sense to produce dual clutch transmissions in the same facilities as used for conventional stepped transmissions.

Dual clutch transmissions for rear wheel drive vehicles often have two separate countershafts, one connected to each input shaft. One example is found in U.S. Pat. No. 5,15,0628 (referred to as 12 and 15). These countershafts are parallel to the transmission input. They make the transmission wider than a conventional stepped transmission. That may lead to difficulties in installing the transmission into the vehicle. On the other hand, the transmission may be shorter instead. Anyway, in some dual clutch transmission designs there is only one countershaft, e.g., as in DE923402 and DE3131156A1. On this countershaft there are loose gearwheels arranged that can be rotationally connected to each other and to the countershaft by selective engagement of mechanical tooth clutches. In a way, this could be regarded as if the second countershaft is arranged coaxial to the first one. The result is a powershiftable dual clutch transmission that is as slim as corresponding conventional stepped transmissions. The number of gears and the speed reduction ratios possible are insufficient for heavy duty vehicles, though.

Some dual-clutch transmission concepts in a so-called winding structure have been presented, for instance U.S. Pat. Nos. 5,347,879, 5,592,854, DE10325647A1 and DE10339758A1. In these, the power is led via four gear meshes in at least one gear, and several gearwheels are used for more than one gear. That will give further reduction of speed. However, this corresponds to just one or two additional gears. These concepts are, hence, less suited to heavy vehicles.

DE102005030987A1, DE102005033027A1, DE102006015661A1 and EP1624232A1 show transmission concepts where a main transmission of dual clutch type is connected in series with a range section. That makes it possible to double the number of gears and obtain gears for high tractive force as well as gears tor high vehicle speed.

Unfortunately, there are shifts between consecutive gears where the power transfer will be interrupted in these designs. That is not an option for heavy on- and off road vehicles subjected to high driving resistance. Two similar designs of dual clutch main transmission in combination with a range section are shown in DE102005050067A1 and WO2007/039021A1. Therein, the input and output of the transmission can be connected by a friction clutch. This friction clutch can transfer power when a gear shift takes place. Thereby, power interruption can be avoided at all gear shifts.

However, for reasonable sizes of this friction clutch, the power transferred to the driven wheels is very small at shifts between low gears. At the same time, the power dissipated in this friction clutch is large at these gear shifts. Thus, these types of dual clutch transmission would have a limited practical use, especially for on- and off-road vehicles.

Dual-clutch transmissions as in U.S. Pat. No. 5,150,628, DE923402 and DE3131156A1 could be combined with a range section.

That gives a compact transmission with several gears and high speed reduction ratios. Gear-shifts between consecutive gears could be without power interruption, except when, the range section is shifted. This would probably be acceptable on most heavy on-road vehicles, but not for, e.g., trucks in hilly applications or articulated haulers.

U.S. Pat. No. 7,353,724 B2 shows in FIGS. 1 and 3 dual-clutch transmissions where a direct connection between one of the input shafts and the output shaft can transmit power when changing between low, underdrive, gears and high, overdrive, gears. This is not a true range section, though. The number of gears is doubled, but in the underdrive gears the power is transmitted via two gear meshes, only, as in FIG. 2 in U.S. Pat. No. 6,958,028 R2. That limits the practically possible speed reduction.

Thereby, these transmissions are not suited to heavy vehicles.

A somewhat similar principle is disclosed in U.S. Pat. No. 4,777,837. There, separate gearwheel pairs are provided for intermediate gears between the low and high range gears. This will give a large number of gears and no power interruptions at gear-shifts between consecutive gears. In low range gears, the power is transmitted via three gear meshes, which will enable large reduction ratios. However, the transmission is both wide and long due to two parallel countershafts and a large number of gearwheels located, side by side. Moreover, the output shaft is not coaxial with the input shaft. That makes the transmission incompatible with most heavy truck designs. The number of components is large, adding costs.

Further on, U.S. Pat. No. 7,070,534 B2 presents a dual clutch transmission 10 with a planetary range section 56 and coaxial input 86 and output 68. A dual clutch unit 20,22 selectively transfers power to input shafts 90 and 92. To each of these input shafts 90, 92 a countershaft, 74 and 76, respectively, is arranged. From each countershaft 74, 76 the power can be selectively directed with tooth clutches 80 and 84 to the output 68 in either of two ways. Firstly, the power can be led to the sun gear 58 of the planetary range section 56 via gearwheels 44, 46 and 54, 46, respectively. That will give a speed reduction in the planetary range section 56, corresponding to low range gears. Secondly, the power can be led more directly to the output 68 via gearwheels 40, 42 and 50, 42, respectively. The planetary range section will then be idling, and high range gears are established. Shifts without power interruption can be carried out between low and high range gears. Unfortunately, the number of rotating components, e.g., gearwheels and tooth clutches, is relatively large in comparison with the number of gears. The large number of gearwheels makes the transmission long, and the two parallel countershafts make it wide. Thereby, it will be difficult to fit in the vehicle. The transmission will be costly to manufacture due to the large number of components. Furthermore, the idling planetary range section will imply unnecessarily large power losses in high range gears. Hence, there are several disadvantages that make this transmission less suited for use in heavy vehicles.

U.S. Pat. No. 6,958,028 B2, FIG. 5, shows a dual clutch transmission with a planetary range section. This transmission is similar to the one in U.S. Pat. No. 7,070,534 B2. The main difference is that both input shafts, 30 and 40, use the same countershaft 50, tooth clutch 130, and gearwheels 122, 124 and 126, 128 between this countershaft and the planetary range section. Power interruption between low and high range gears is eliminated by a bridge torque path via a separate countershaft 152. That makes the transmission wide, and it shares the rest of the disadvantages of the one in U.S. Pat. No. 7,070,534 B2; many components, long, and high power losses for high range gears.

In US 2008/0188342A1, FIG. 1 presents a single countershaft dual clutch main transmission 10 combined with a planetary range section 12. A bridge torque path is formed by a tooth clutch 84 that rotationally locks a loose gearwheel 64 on main shaft 28 to a planet carrier 68 rotationally fixed to output shaft 70. When power is led in this path, the gearwheels in the planetary range section are idling, and it can be shifted between high and low positions. This gives a narrow transmission with high reduction ratios where power interruptions can be avoided at every shift between consecutive gears. However, this bridge path embodiment has a number of drawbacks. Firstly, the tooth clutch 84 is of complex design, making it costly and long. Secondly, the bearing 32 that carries main shaft 28 must be located in front of loose gearwheel 64. This puts a large part of the main shaft 28 behind bearing 32, which, in turn, increases misalignments in the ramie section and tooth clutch 84. Moreover, the assembly of the transmission is not facilitated by a main shaft having gearwheels and tooth clutches on both, sides of the housing wall that carries bearing 32.

Thirdly, adding parts for tooth clutch 84 will make the already complex shape of planet carrier 68 even more complex and tricky to produce. FIG. 3 shows a similar dual, clutch main transmission in combination with a non-planetary range section 102. For the rest, this transmission has similar properties as the one in FIG. 1. DE102007047671A1 shows a similar design that has similar disadvantages.

U.S. Pat. No. 5,385,066 presents several transmissions where a conventional stepped main transmission 12 is combined with a non-planetary range section 14. Tooth clutches 184 can selectively rotationally lock the main transmission countershafts 142 to the range section countershafts 172. Thereby, additional gears can be obtained without adding gearwheels. That will make the transmissions short in length and cost-effective to produce. However, these transmissions are of conventional type, having a single frictional master clutch and power interruption at every gear shift. This limits their use to on-road, non-severe heavy vehicle applications.

Thus, for heavy, on- and off-road vehicles there is a need for a transmission that i) enables high power transfer to the driven wheels during all shifts between consecutive gears, it) can provide high reduction ratios, iii) is cost-effective and simple to produce, iv) has low power losses and v) can be installed in a vehicle where the space available, especially axially, is limited.

Thus, it is desirable to present an improved transmission.

BRIEF DESCRIPTION OF THE DRAWINGS

The present invention will be described in greater detail below with reference to the accompanying drawings which, for the purpose of exemplification, shows further preferred, embodiments of the invention and also the technical background, and in which.

DETAILED DESCRIPTION

Figure 1:
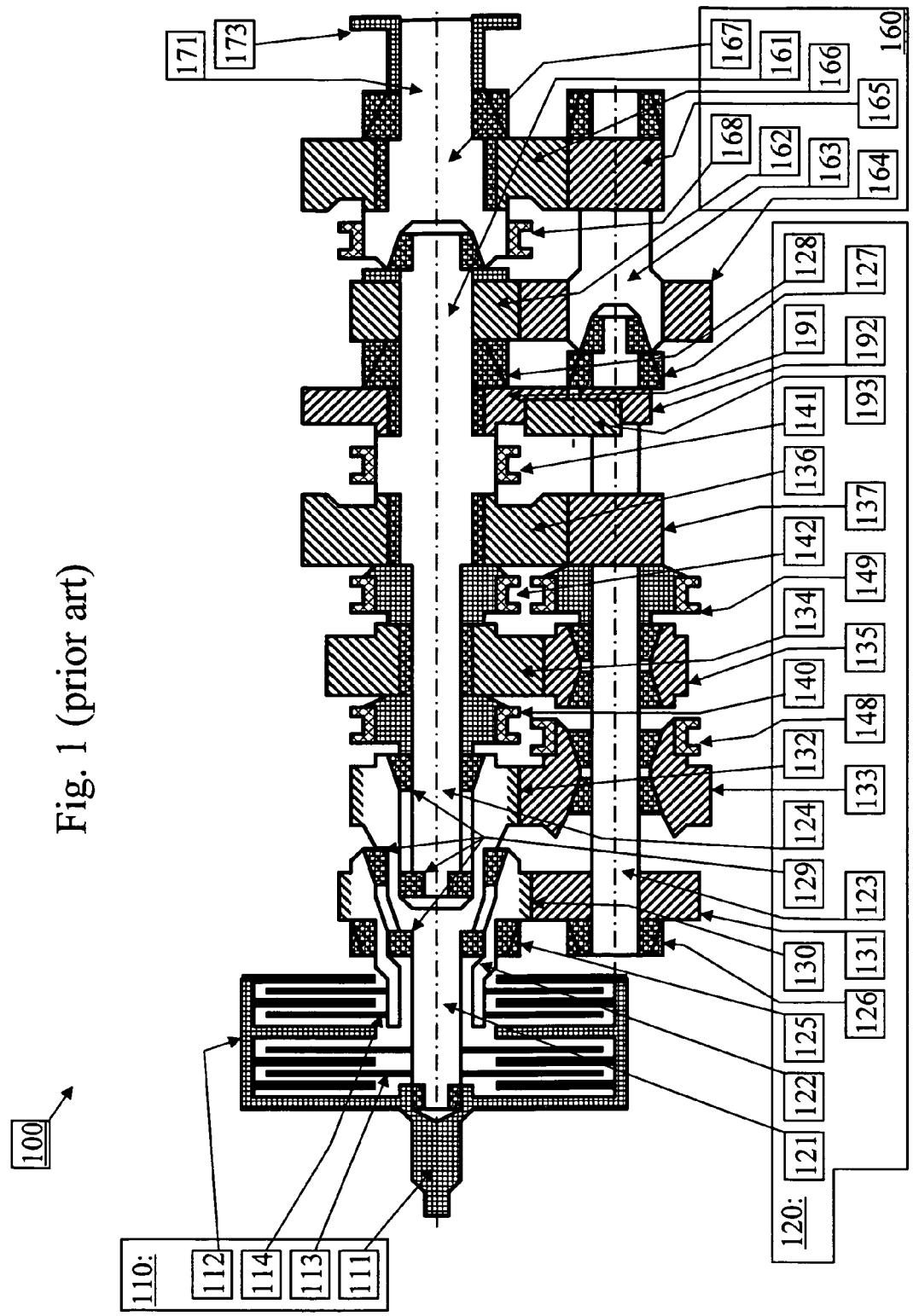
FIG. 1 shows a straightforward combination of a prior art dual clutch main transmission and range section, the resulting transmission having interrupted power transfer at range shifts.

FIG. 1 shows schematically a longitudinal section the rotating parts of a transmission 100 for a heavy vehicle. The transmission 100 is composed of a dual frictional clutch unit 110, a main transmission 120 of dual clutch transmission type, and a range section 160 of non-planetary type. The dual frictional clutch unit 110 comprises a clutch input shaft 111 driven by an engine crankshaft (not shown), a clutch assembly 132 connected thereto, featuring first and second sub-clutches 113, 114, and an actuator device (not shown) to control the clutch unit.

The main transmission 120 has two input shafts; a first input shaft 121 and a second input shaft 122. The first input shaft 121 can be rotationally driven by the first sub-clutch 113. Similarly, the second input shaft 122 can be rotationally driven by the second sub-clutch 114.

A first primary gearwheel 132 is rotationally fixed or integral with the first input shaft 121. A second primary gearwheel 130 is rotationally fixed or integral with the second input shaft 122. A main shaft 124 is coaxial with the input shafts 121 and 122. A countershaft 123 is parallel thereto. The second input shall 122 is carried by the transmission housing (not shown) with an input shaft bearing 125. Between the main shaft 124, the first input shaft 121 and the second input shaft 122, four pilot bearings 129 are arranged. Thereby, a thorough but not over-constrained suspension of the main and input shaft is achieved.

The main, shaft 124 carries three loose gearwheels; the second secondary loose gearwheel 134, first secondary loose gearwheel 136 and reverse secondary loose gearwheel 191. Here, the first and reverse secondary loose gearwheels 136 and 191 can be rotationally locked to the main shaft by a first/reverse tooth clutch 141. The second secondary loose gearwheel 134 can be rotationally locked to the main shaft 124 by a second tooth clutch 142. Finally, the main shaft 124 and first input shaft 121 can be rotationally locked by a direct tooth clutch 140.

On the countershaft 123, an even primary gearwheel 131 meshes with the second, primary gearwheel 130 of the second input shaft 122. A primary countershaft loose gearwheel 133 meshes with first primary gearwheel 132 of the first input shaft 121. A secondary countershaft loose gearwheel 135 meshes with the second secondary loose gearwheel 134 on the main shaft 124. The first secondary loose gearwheel 136 meshes with a first secondary gearwheel 137 that is integral or rotationally fixed with the countershaft 123. Then, a reverse secondary gearwheel 192, which is integral or rotationally fixed with countershaft 123, and the reverse secondary loose gearwheel 191 are both in mesh with a reverse idler gearwheel 193.

The countershaft, loose gearwheels 133 and 135 can selectively be rotation ally locked by a first countershaft tooth clutch 148. The secondary countershaft loose gearwheel 135 can selectively be rotationally locked to countershaft 123 by a second countershaft tooth clutch 149.

The main shaft tooth clutches 140, 141 and 142, and the countershaft tooth clutches 148 and 149 are controlled by not shown gear-shift control that may comprise valves, actuators, shift rods, shift forks, electronics and sensors, as known by a person skilled in the art.

The range section 160 comprises a range input shaft 161 and a range primary gearwheel 162 that are integral or rotationally fixed with the main shaft 124, a range countershaft 163 that is integral or rotationally fixed with a primary range countershaft gearwheel 164 and a secondary range countershaft gearwheel 165, a secondary range loose gearwheel 166 that is carried by a range main shaft 167, and a range tooth clutch 168. The range main shaft 167 can selectively be rotationally locked by the range tooth clutch 168 to the range input shaft 161, for high range gears, or to the secondary range loose gearwheel 166 for low range gears. The range main shaft 167, an output shaft 171 and companion flange 173 are integral or rotationally fixed.

The main transmission 120 is functionally identical or very similar to dual clutch transmissions in DE923402 and DE3131156A1. It has six forward gears where high power transfer to the driven wheels is enabled during shifts between consecutive gears. The combination with range section 160 increases the number of gears and the maximum reduction ratio of the complete transmission 100, albeit with power interruption when range section 160 is shifted.

Figure 2:
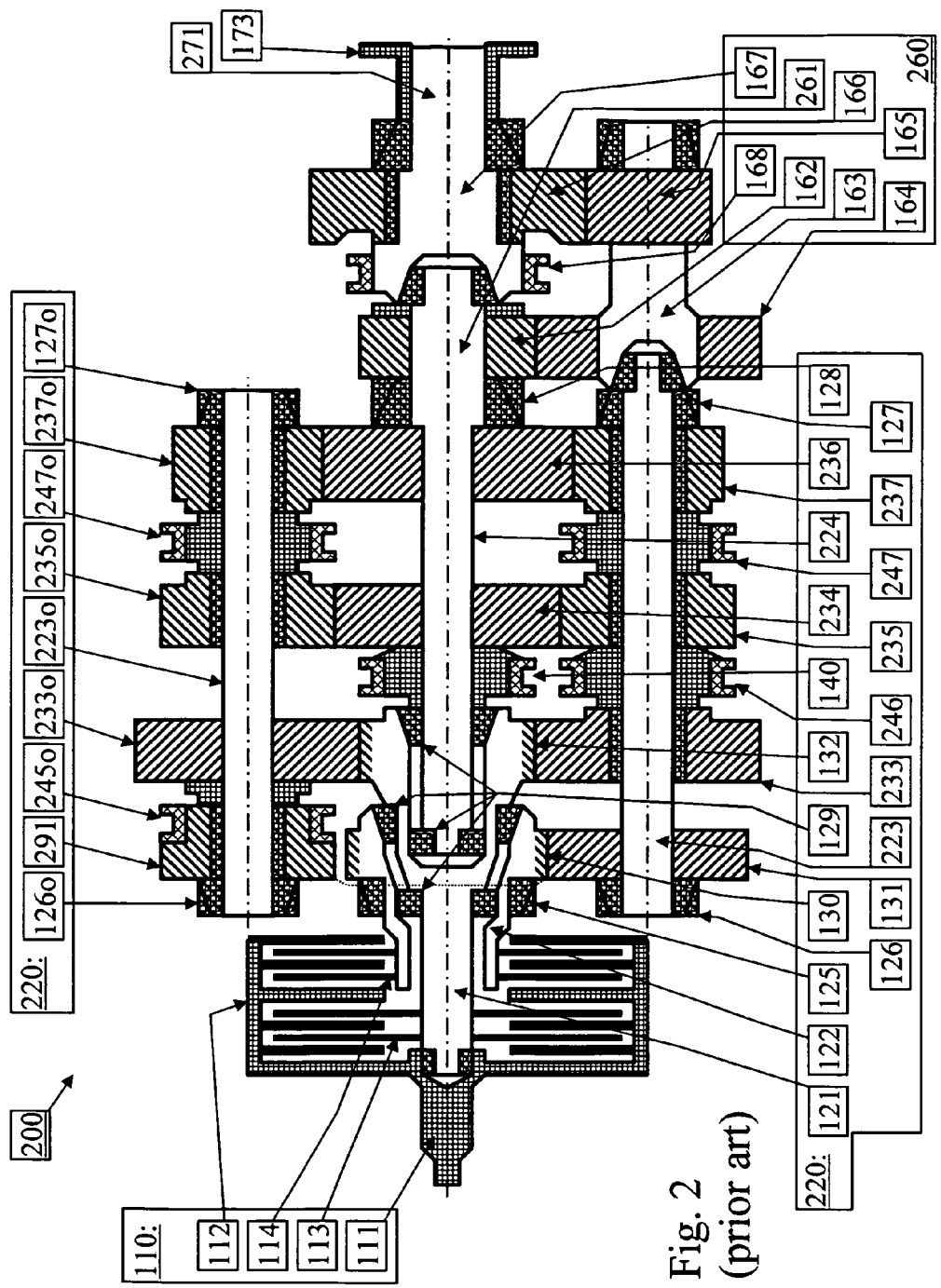
FIG. 2 shows a similar transmission with an alternate prior art main transmission.

FIG. 2 shows a transmission 200 whose overall, function can be considered as equivalent to the transmission 100 in FIG. 1. Several parts in FIG. 2 are, or could be, identical to the corresponding parts in FIG. 1. Those parts are referred to by the same numbers as in FIG. 1, by the initial digit 1.

Corresponding non-identical parts have the same last two digits but initial digit 2. The main transmission 220 is similar to the transmission in U.S. Pat. No. 5,150,628, having two countershafts; an odd countershaft 223o for odd gears and an even countershaft 223 for even gears. The dual frictional clutch unit 110, input shafts 121 and 122, and direct tooth clutch 140 are identical to those in FIG. 1. A third/fourth main shaft gearwheel 234 and a first/second main shaft gearwheel 236 are rotationally fixed with a main shaft 224.

On the even countershaft 223, a rotationally fixed even primary gearwheel 131 meshes with the second primary gearwheel 130 of the second input shaft 122, as in FIG. 1. The even countershaft 223 carries three loose gearwheels; an overdrive loose gearwheel 233, a fourth loose gearwheel 235, and a second loose gearwheel 237. The overdrive loose gearwheel 233 is in mesh with the first primary gearwheel 132 of the first input shaft 121. The fourth loose gearwheel 235 and second loose gearwheel 237 mesh with the third/fourth and first/second main shaft gearwheels 234 and 236, respectively. An overdrive tooth clutch 246 can selectively rotationally lock the overdrive loose gearwheel 233 and even countershaft 223. Furthermore, the even countershaft 223 can selectively be rotationally locked by a second/fourth tooth clutch 247 to either the fourth loose gearwheel 235 or second loose gearwheel 237.

The odd countershaft 223o is rotationally fixed with an odd primary gearwheel 233o that is in mesh with, the first primary gearwheel 132 of the first input shaft 121. Three further gearwheels are carried by the odd countershaft 223o; a reverse loose gearwheel 291, third loose gearwheel 235o, and first loose gearwheel 237o, The reverse loose gearwheel 291 is in mesh with the even primary gearwheel 131 on the even countershaft 223, Hence, the main shaft 224, even countershaft 223, and odd countershaft 223o are arranged in triangular form, as in U.S. Pat. No. 5,150,628. The third loose gearwheel 235o and first loose gearwheel 237o are meshing with the main shaft gearwheels 234 and 236. The reverse loose gearwheel 291 can selectively be rotationally locked to the odd countershaft 223o by a reverse tooth clutch 245o, Finally, a first/third tooth clutch 247o can selectively rotationally lock the odd countershaft 223o to either the third loose gearwheel 235o or first loose gearwheel 237o.

The range section 260 comprises a range input shaft 261 that is integral or rotationally fixed with the main shaft 224. For the rest, it is identical to the range section 160. The range countershaft 163 in FIGS. 1 and 2 is coaxial with the countershaft 123 and even countershaft 223, respectively. This may facilitate the suspension of the range countershaft 163, but it is not required for the function. Due to the large torques that can occur in the range section 160, it would from a strength view be favourable to have a larger distance between the range countershaft 163 and the range main shaft 167.

It will now be described how the different gears can be achieved in the main transmission 220. Each of these gears can be used with the range section 260 in high as well as low mode.

In first forward gear, the first/third tooth clutch 247o in right position rotationally locks first loose gearwheel 237o and odd countershaft 223o. Power is led from first sub-clutch 113, via first input shaft 121, odd primary gearwheel 233o, odd countershaft 223o, first loose gearwheel 237o, first/second main shaft gearwheel 236, and main shaft 224 to range input shaft 261.

In second forward gear, the second/fourth tooth clutch 247 is in the right position, where the even countershaft 223 is rotationally locked to the second loose gearwheel 237. The second sub-clutch 114 transfers the power via the second input shaft 122, even primary gearwheel 131, even countershaft 223, second loose gearwheel 237, first/second main shaft gearwheel 236, and main shaft 224 to the range input shaft 261.

In third forward gear, the left position of first/third tooth clutch 247o will rotationally lock odd countershaft 223o and third loose gearwheel 235o. Power flows via first sub-clutch 113, first input shaft. 121, odd primary gearwheel 233o, odd countershaft 223o, third loose gearwheel 235o, third/fourth main shaft gearwheel 234, and main shaft 224 to range input shaft 261.

In fourth forward gear, second/fourth tooth clutch 247 is in its left, position. Thereby, the even countershaft 223 is rotationally locked to the fourth loose gearwheel 235. That establishes a power path from the second sub-clutch 114 via the second input shaft 122, even primary gearwheel 131, even countershaft 223, fourth loose gearwheel 235, third/fourth main shaft gearwheel 234, and main shaft 224 to range input shaft 261.

In fifth forward gear, the first input shaft 121 is rotationally locked to the main shaft 224 by the direct tooth clutch 140. This gives a direct gear with power transfer from the first sub-clutch 113 via first input shaft 121 and main shaft 224 to the range input shaft 261.

In sixth forward gear, the direct tooth clutch 140 is engaged, as in the fifth gear, and the overdrive tooth clutch 246 rotationally locks the overdrive loose gearwheel 233 and even countershaft 223. That gives a power path from the second sub-clutch 114 via the second input shaft 122, even primary gearwheel 131, even countershaft 223, overdrive loose gearwheel 233, first input shaft 121 and main shaft 224 to the range input shaft 261.

In reverse gears, the reverse loose gearwheel 291 is rotationally locked to the odd countershaft 223o by the reverse tooth clutch 245o. Then, the power is transferred from the second sub-clutch 114 via second input shaft 122, even primary gearwheel 131, and reverse loose gearwheel 291 to the odd countershaft 223o. From there, the power can be led to the main shaft 224 via any of the first loose gearwheel 237a, third loose gearwheel 235o, or odd primary gearwheel 233o, depending on the positions of the first/third tooth clutch 247o and direct tooth clutch 140. At shifts between the reverse gears, power interruptions will occur.

It would be of advantage if the transmissions 100 and 200 could be modified to eliminate the range shift, power interruption. Preferably, such a modification should have a minimum impact on the advantageous features of the transmissions in terms of size, cost, power losses and similarities with conventional stepped transmissions. There are interesting solutions in U.S. Pat. No. 6,958,028 B2 (FIG. 5) and U.S. Pat. No. 7,070,534 B2, with low and high range power paths in the main transmission.

However, that would result in a longer and wider transmission or a lower number of gears. The designs in US 2008/0188342A1 would be better, still requiring significant axial space, though. Moreover, the forward position of the rear main shaft and countershaft bearings will, as discussed earlier, have a negative impact at the assembly and. on misalignments in operation. The design in FIG. 3 in US 2008/0188342A1, with a non-planetary range section, would have high power losses due to a range countershaft-158 that rotates at high speed.

Figure 3:
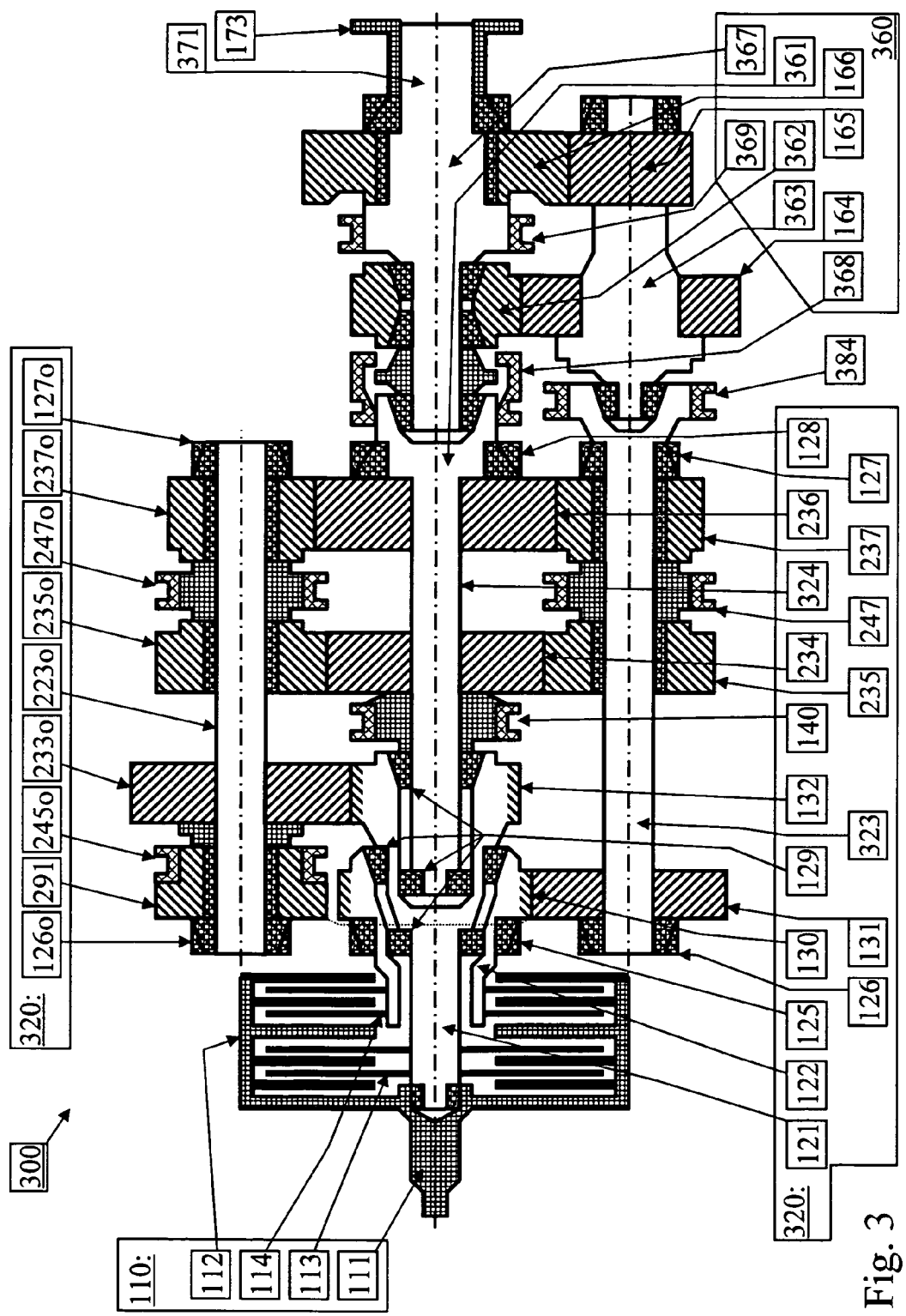
FIG. 3 shows a transmission according to the invention with no power interruption at shifts.

A modified dual clutch transmission 300 according to the invention is shown in FIG. 3. There, a by-passing tooth clutch 384 is added and the range section 360 is modified. The by-passing tooth clutch 384 can selectively rotationally lock a modified, countershaft 323 to a modified range countershaft 363. As in range sections 160 and 260 in FIGS. 1 and 2, a primary range countershaft gearwheel 164 and a secondary range countershaft gearwheel 165 are integral or rotationally fixed with the range countershaft 363. The primary range countershaft gearwheel 164 is in mesh with a primary range loose gearwheel 362. The secondary range countershaft gearwheel 165 meshes with secondary range loose gearwheel 166. The range loose gearwheels 362 and 166 are carried by a modified range main shaft 367 that is integral or rotationally fixed with an output shaft 371 and companion flange 173. There are two tooth clutches in the range section 360; a range input tooth clutch 368 and a range output tooth clutch 369. The range input tooth clutch 368, of "Daniel" type, can selectively rotationally lock, a part to the left (range input shaft 361) to either a part in the middle (range main shaft 367) or a part to the right (primary range loose gearwheel 362). The range output, tooth clutch 369 can selectively rotationally lock range main shaft 367 with secondary range loose gearwheel 166 or primary range loose gearwheel 362.

The first five forward gears are established in the main section 320 in the same way as for the transmission 200. The range input tooth clutch 368 Is in its right position, rotationally locking the range input shaft 361 to the primary range loose gearwheel 362. Furthermore, the range output tooth clutch 369 rotationally locks the secondary range loose gearwheel 166 and range main shaft 367. From the range input shaft 361, the power is transferred via the primary range loose gearwheel 362, primary range countershaft, gearwheel 164, range countershaft 363, secondary range countershaft gearwheel 165, secondary range loose gearwheel 166, and range main shaft 367 to the output shaft 371. This is the low range mode.

In the sixth forward gear, the by-passing tooth clutch 384 is engaged and rotationally locking the countershafts 323 and 363. As in the lower gears, the range output tooth clutch 369 is also engaged. This establishes a power path from the second sub-clutch 114 via the second input shaft 122, even primary gearwheel 131, even countershaft 323, range countershaft 363, secondary range countershaft gearwheel 165, secondary range loose gearwheel 166, and range main shaft 367 to the output shaft 371. Thereby, the range input tooth clutch 368 does not transfer any torque, and it can be shifted between its left and right positions. The bypassing tooth clutch 384 thus acts as the "bridge torque path" in U.S. 6,958,028 B2. In comparison with corresponding functions in U.S. Pat. No. 6,958,028 B2 and US 2008/096228A1, no additional gearwheels are required in transmission 300, readily available gearwheels are used.

In the seventh forward gear, the main transmission 320 is configured as in the first forward gear. The range input tooth clutch 368 is in its left position, where the range input shaft 36 i is rotationally locked to the range main shaft 367. This is the high range mode, transferring the power directly between the range input shaft 361 and range main shaft 367.

It can be noted that the transmission 300 ears shift from fifth gear to sixth and on to seventh gear, and vice versa, without interrupting the power transfer. The use of the by-passing tooth clutch 384 in sixth gear is very similar to the corresponding gears in U.S. Pat. No. 5,385,066. However, the transmission 300 is not just a simple combination of the transmission 200 and the U.S. Pat. No. 5,385,066 design with a tooth clutch between countershafts in main transmission and range section. In transmission 300, this results in an advantage where accordingly it is possible to avoid the power interruption when the range section 360 is shifted between low and high mode.

The eighth, ninth, tenth and eleventh gears are the high range versions of the second, third, fourth and fifth gears, respectively. In the range section 360, range output tooth clutch 369 is in neutral position. This gives low rotational speed of the range countershaft 363. The by-passing tooth clutch 384 is unloaded but remains engaged for use in higher gears. The eleventh gear is a direct gear where the first input shaft 121 and output shaft 371 are rotationally locked.

In the twelfth forward gear, the by-passing tooth clutch 384 is engaged, and the range output tooth clutch 369 is in its left position. This will rotationally lock the primary range loose gearwheel 362 to the range main shaft 367. That will enable a power transfer from the second sub-clutch 114 via the second input shaft 122, even primary gearwheel 131, even countershaft 323, range countershaft 363, primary range countershaft gearwheel 164, primary range loose gearwheel 362, and range main shaft 367 to the output shaft 371.

In the thirteenth forward gear, the range input tooth clutch 368 is in its middle, neutral position. The direct tooth clutch 140 is engaged, and the second/fourth tooth clutch 247 is in its left position, where the even countershaft 223 is rotationally locked to the fourth loose gearwheel 235. The by-passing tooth clutch 384 and the range output tooth clutch 369 are engaged as in the previous gear. Thereby, a power path is established from the first sub-clutch 113 via first input shaft 121, main shaft 224, third/fourth main shaft gearwheel 234, fourth loose gearwheel 235, even countershaft 323, range countershaft 363, primary range countershaft gearwheel 164, primary range loose gearwheel 362, and range main shaft 367 to the output shaft 373.

The reverse gears are obtained in the same way as in transmission 200. Still there will be power interruptions when shifting between them.

Figure 4:
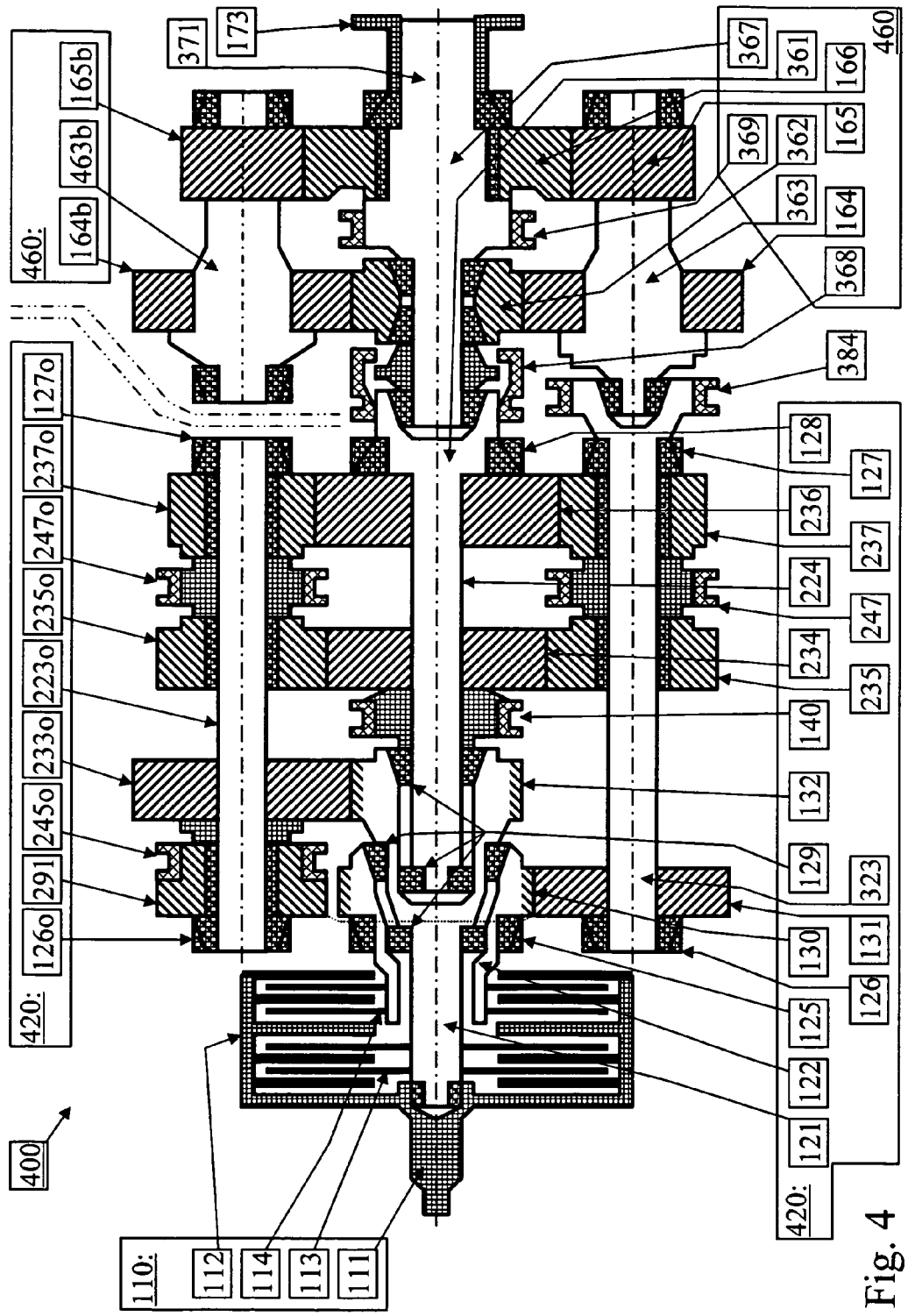
FIG. 4 shows an embodiment of the invention with strengthened range section.

The by-passing concept in the transmission 300 with the by-passing tooth, clutch 384 requires that the countershafts 323 and 363 are coaxial. From a strength point of view, this is not always ideal, in the lowest gears, the torques in the range section 360 may become very large, significantly larger than in the main transmission 320. Hence, a larger centre distance would be preferable for the meshing gearwheels in the range section 360 compared to the main transmission 320. A common centre distance will be a compromise that will tend to result in unproportionally wide or narrow gearwheels and/or insufficient strength. FIG. 4 shows one way to handle the disadvantages of a common centre distance, in transmission 400, the range section 460 has a second range countershaft 463b that is arranged diametrically opposed the original range countershaft 363. The use of two diametrically opposed countershafts is well-known in the art. U.S. Pat. No. 5,385,066 is one example thereof, in the transmission 400. this will strengthen the range section 460. In the lowest, five gears, the torque on the range input shaft 361 will be divided; substantially half thereof will be transferred via the original range countershaft 363 and the remaining half via the second range countershaft 463b. This will, have the advantage of making it possible to have reasonable proportions of the gearwheels in both the main transmission 420 and the range section 460 in spite of the restriction to a common centre distance. The use of three range countershafts, or more, at equal angular spacing is also possible.

The transmissions in FIGS. 3 and 4 have few reverse gears, there are very large ratio steps between some consecutive reverse gears, and gear shifts between them may require power interruption. This is not acceptable for some types of vehicle, e.g., off-road vehicles like construction trucks and articulated haulers. There, several reverse gears are required, with, reasonable gear ratio steps in between, and power interruptions at gear shirts are undesirable.

Figure 5:
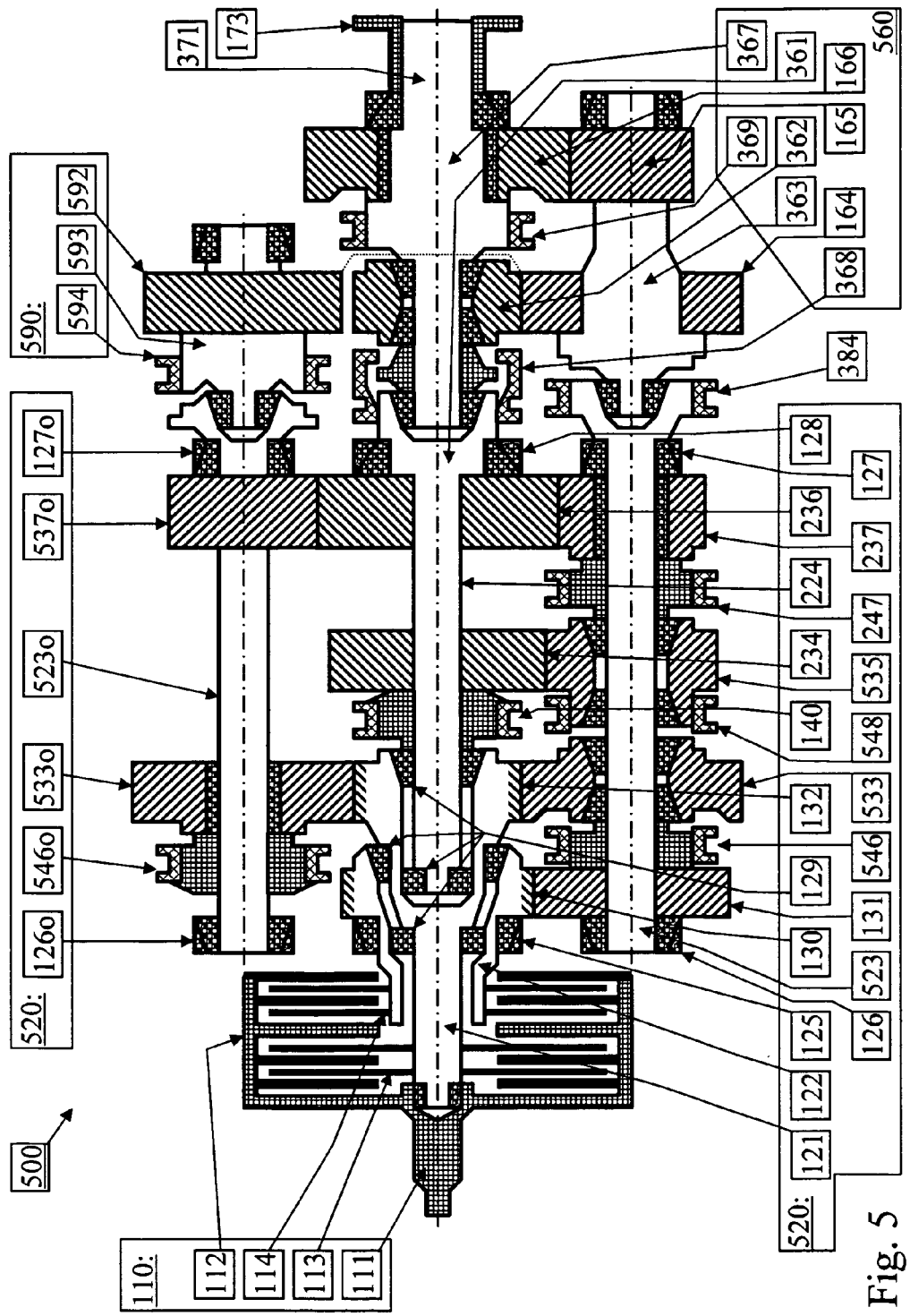
FIG. 5 shows an embodiment of the invention with several reverse gears.

FIG. 5 shows an embodiment of the invention; a modified dual clutch transmission 500 where the reverse gears are accomplished in a different way than in FIGS. 3 and 4. A reverse unit 590 comprises a reverse gearwheel 592 that is integral or rotationally fixed with a reverse countershaft 593, The reverse countershaft 593 is coaxial with a modified odd countershaft 523o in the main section 520. A reverse tooth clutch 594 can selectively rotationally lock the odd countershaft 523o and reverse countershaft 593.

Alternatively; the reverse gearwheel 592 could be a loose gearwheel on an elongated portion of the odd countershaft 523o.

On the odd countershaft 523o, two gearwheels are arranged; an odd primary loose gearwheel 533o and an integral or rotationally fixed first gearwheel 537o. Here, the odd primary loose gearwheel 533o is in mesh with the first primary gearwheel 132 on the first input shaft 121, and it can selectively be rotationally locked to the odd countershaft 523o by an odd primary tooth clutch 546o. The first gearwheel 537o is in mesh with the first/second main shaft gearwheel 236 on the main shaft 224.

The modified even countershaft 523 carries four gearwheels; the even primary gearwheel 131, an overdrive loose gearwheel 533, a fourth loose gearwheel 535, and the second loose gearwheel 237, An overdrive tooth clutch 546 can selectively rotationally lock the even countershaft 523 and overdrive loose gearwheel 533. A loose gearwheel tooth clutch 548 can selectively rotationally lock the overdrive loose gearwheel 533 and fourth loose gearwheel 535. The even countershaft 523 can selectively be rotationally locked to the fourth loose gearwheel 535 or second loose gearwheel 237 by the second/fourth tooth clutch 247.

The range section 560 can be identical to any of the range sections 360 and 460. This also holds for the bypassing tooth clutch 384. The primary range countershaft gearwheel 164, or 164b, is in mesh with the reverse gearwheel 592. Then, the engagement of the reverse tooth clutch 594 will establish a power path from the main shaft 224 to the output shaft 371 via three gear meshes; 236/537o, 592/164 and 165/166, This will make the output shaft 371 rotate in opposite sense as the main shaft 224.

In all reverse gears, the reverse tooth clutch 594 is engaged, and the range output tooth clutch 369 is in its right position, rotationally locking range main shaft 367 and secondary range loose gearwheel 166. The first reverse gear is established by engaging the odd primary tooth clutch 546o. The power is led from the first sub-clutch 113 via the first input shaft 121, odd primary loose gearwheel 533o, odd countershaft 523o, reverse countershaft 593, reverse gearwheel 592, primary range countershaft gearwheel 164, range countershaft 363, secondary range countershaft, gearwheel 165, secondary range loose gearwheel 166, and range main shaft 367 to the output shaft 371.

In second reverse gear, the second/fourth tooth clutch 247 is in the right position, where second loose gearwheel 237 is rotationally locked to even countershaft 523. From second sub-clutch 114 power is led via second input shaft 122, even primary gearwheel 131, even countershaft 523, second loose gearwheel 237, first/second main shaft, gearwheel 236, first gearwheel 537o, odd countershaft 523o, and onto output shaft 371 as in first reverse gear.

In third reverse gear, the loose gearwheel tooth clutch 548 is engaged. This gives a power path from first sub-clutch 113 via first input shaft 121, overdrive loose gearwheel 533, fourth loose gearwheel 535, third/fourth main shaft gearwheel 234, main shaft 224, first/second main shaft gearwheel 236, first gearwheel 537o, odd countershaft 523o, etc., onto output shaft 371. The power is led via the loose rearwheel tooth clutch 548 also in third forward wear.

The fourth reverse gear uses the left position of the second/fourth tooth clutch 247, locking the fourth loose gearwheel 535 rotationally to the even countershaft 523. A power path is then established via the second sub-clutch 114, second input shaft 122, even primary gearwheel 131, even countershaft 523, fourth loose gearwheel 535 and on as in third reverse gear.

In the fifth reverse gear, the direct tooth clutch 140 is engaged, which rotationally locks the first input shaft 121 and main shaft 224. The power path is from the first sub-clutch 113 via the first input shaft 121 to the main shaft 224 and on as in third and fourth reverse gears.

Finally, in the sixth reverse gear, the overdrive tooth clutch 546 and direct tooth clutch 140 are engaged.

From the second sub-clutch 114 this leads the power via' the second input shaft 122, even primary gearwheel 131, even countershaft 523, overdrive loose gearwheel 533, first input shaft 121, main shaft 224 and on to the output shaft 371 via reverse unit 590.

Hence, the introduction of the reverse unit 590 along with the other modifications has resulted in six reverse gears in the transmission 500. The ratio steps between these reverse gears can be shown to be identical or very similar to those of the corresponding forward gears. Furthermore, shifts between consecutive gears can be carried out without power interruption.

An alternative to having the reverse unit 590 arranged coaxial to the odd countershaft 523o would be to have a reverse countershaft, that, was parallel to the other shafts, extended into the main, transmission 520, and carried a gearwheel that meshed with any of the gearwheels (234, 236) on the main shaft 224, or any of the other main transmission gearwheels. That would, however, result in increased cost (the additional gearwheel), as well as increased lateral extension of the transmission. Thus, the design in FIG. 5 is cost-and space saving.

In FIGS. 3 and 4, the main transmissions 320 and 420 could, be replaced by the single countershaft main transmission 100 in FIG. 1. This would not work in FIG. 5, where two parallel main transmission countershafts (523, 523o) are required.

Hence, the transmission 300 in FIG. 3 can have i) gearshifting between consecutive gears without power interruption, and ii) high reduction ratio. The components therein are limited in number and similar to those in conventional manual and automated transmissions. Thereby, iii) cost advantages will result. The use of just a dual frictional clutch, and tooth clutches for the rest, will result in iv) low power losses, as in conventional transmissions.

Finally, compact construction, especially in axial direction, will make the dual clutch transmission 300 v) easy to install in the vehicle. Hence, the full scope of the invention can potentially be fulfilled.

Variations from FIG. 3 are possible without departing from the scope of the invention:

In a preferred embodiment, there are multiple parallel countershafts in the range section, as in FIG. 4. This handles large range section torques in spite of the centre distance limitations.

In another preferred embodiment, reverse gear power paths use a gearwheel that is coaxial with a main transmission countershaft and in mesh with a range section gearwheel, as in FIG. 5.

In a further preferred embodiment, two tooth clutches are controlled by the same actuator, e.g., fluid cylinder or electromagnetic solenoid. Furthermore, shift forks for these tooth clutches may be carried by the same shift rod. This will reduce the costs. One example is the direct tooth clutch 140 along with either the reverse tooth clutch 245o or the odd primary tooth clutch 546o. Another possibility could be the reverse tooth clutch 594 along with the by-passing tooth clutch 384.

In an alternative embodiment; the reverse gearwheel 592 is rotatably arranged on a shaft portion that is integral or rotationally fixed with the coaxial main section countershaft (523o).

In another alternative embodiment, the primary range loose gearwheel 362 is rotatably arranged on a shaft portion that is integral or rotationally fixed with the main shaft 224. Tooth clutch arrangements will then selectively establish rotational connections from the main shaft 224 to this loose gearwheel and to the output shaft 371.

In a further alternative embodiment, the primary range loose gearwheel 362 is integral or rotationally fixed with the main shaft 224. Moreover, the primary range countershaft gearwheel 164 is a loose gearwheel that is rotatably arranged on the range countershaft 363, and a tooth clutch can selectively rotationally lock these two parts. A second tooth clutch is also required for selectively rotationally locking the main shaft 224 to the output shaft 371.

In a preferred embodiment, the width of the first primary gearwheel 132 of the first input shaft 121 in FIG. 5 is doubled, and the overdrive loose gearwheel 533 is arranged at a different axial location than the odd primary loose gearwheel 533o. That makes it possible to locate the even countershaft 523 and odd countershaft 523o close to each other without interference between, the overdrive loose gearwheel 533 and odd primary loose gearwheel 533o. This will make the transmission more compact in lateral extension.

Furthermore, this can enable a smaller diameter of the reverse gearwheel 592, which will result in desirable high redaction ratios for the reverse gears. Similar measures can also be applied on, e.g., the gearwheels 235, 234, 235o and 131, 130, 291 in FIGS. 3 and 4. The main transmissions 320 and 420 could be substituted by any other dual clutch transmission with a countershaft, e.g., the single countershaft main transmission 120. Other arrangements and locations of friction clutches are possible, e.g., as in U.S. Pat. Nos. 5,347,879 or 4,777,837.

Moreover, designs with three friction clutches, "triple clutch transmissions", or more, e.g., DE4226577C.1, US 2008/0190228A1 or US 2009/0036247A1 could be Included. Powershifting transmissions with more than one friction clutch are referred to as multi-clutch transmissions. In general, more friction clutches imply larger power losses, though. If several friction clutches are involved at a shift, e.g., range shifts in US 2009/0036247A1., control issues are likely.

The tooth clutches 140, 245o, 247, 247o, 368, 369, 384, 546, 546o, 548 and 594 may or may not have synchronizing parts to facilitate engagement, as is readily known by a person skilled in the art. A central synchronizing device would also be possible, e.g. as 30 in U.S. Pat. No. 5,150,628.

The invention should not be deemed to be limited to the embodiments described above, but rather a number of further variants and modifications are conceivable within the scope of the following patent claims.

The invention claimed is:

1. Multi-clutch transmission for a motor vehicle with a prime mover, having a main transmission, a range section and an output shaft, the main transmission comprising at least one input shaft, a main shaft and a main countershaft that is parallel to the main shaft, the main shaft being an output member of the main transmission and integral or rotationally fixed with a range input shaft of the range section, the range section comprising a range main shaft that is integral or rotationally fixed with the output shaft, a range countershaft, range gearwheels that can selectively transfer power from a range input member to the range countershaft and on to the range main shaft, and range clutches, the multi-clutch transmission comprising a by-passing torque path, wherein the by-passing torque path comprises a by-passing clutch that selectively can rotationally lock the main countershaft to the range countershaft, wherein the range section at least two alternating torque paths having different speed ratios can be established by selective engagement and disengagement of at least one of the range clutches and wherein the one range clutch is a tooth clutch having two engaged positions, wherein power can be transferred in the by-passing torque path when the range section is shifted, wherein the one range clutch selectively can rotationally lock the range input shaft to the range main shaft or to one of the range gearwheels that is a primary range loose gearwheel.

2. Multi-clutch transmission as in claim 1, wherein the by-passing clutch transfers power in at least two speed ratios that use different sets of the range gearwheels for power transfer between the range countershaft and the output shaft.

3. Multi-clutch transmission as in claim 1, wherein the range section comprises a plurality of substantially identical range countershafts that share the power transferred in the range section in some gears and are arranged at equal angular spacing around an output member.

4. Multi-clutch transmission as in claim 1, wherein the main transmission has a second main countershaft that transfers power in at least one forward gear and can selectively be rotationally locked with, for reverse gears, a gearwheel that is in mesh with one of the range gearwheels.

5. Multi-clutch transmission as in claim 1, wherein in the main transmission different torque paths having different speed ratios can be established by selective engagement and disengagement of clutches of which at least one is a tooth clutch that is shifted by a shift fork and carried by a shift rod that is controlled by a shift actuator.

6. Multi-clutch transmission as in claim 1, wherein the main shaft and the input shaft (are coaxial.

7. Multi-clutch transmission as in claim. 1, wherein the main shaft and the output shaft are coaxial.

8. Multi-clutch transmission as in claim 1, wherein the main countershaft carries a number of gearwheels that are in mesh with gearwheels that are carried by the main shall or the at least one inputshaft.

9. Multi-clutch transmission as in claim 1, wherein two tooth clutches are controlled by an actuator.

10. Multi-clutch transmission as in claim 1, wherein the multi-clutch transmission is a dual clutch transmission.

\* \* \* \* \*